July 30, 1963 J. W. RITTER ET AL 3,099,431
VALVE WITH STERN SEAL
Filed April 7, 1961 2 Sheets-Sheet 1

INVENTORS
JOHN W. RITTER
EDUARDO L. CUSI
BY
ATTORNEY

July 30, 1963
J. W. RITTER ET AL
3,099,431
VALVE WITH STERN SEAL
Filed April 7, 1961
2 Sheets-Sheet 2
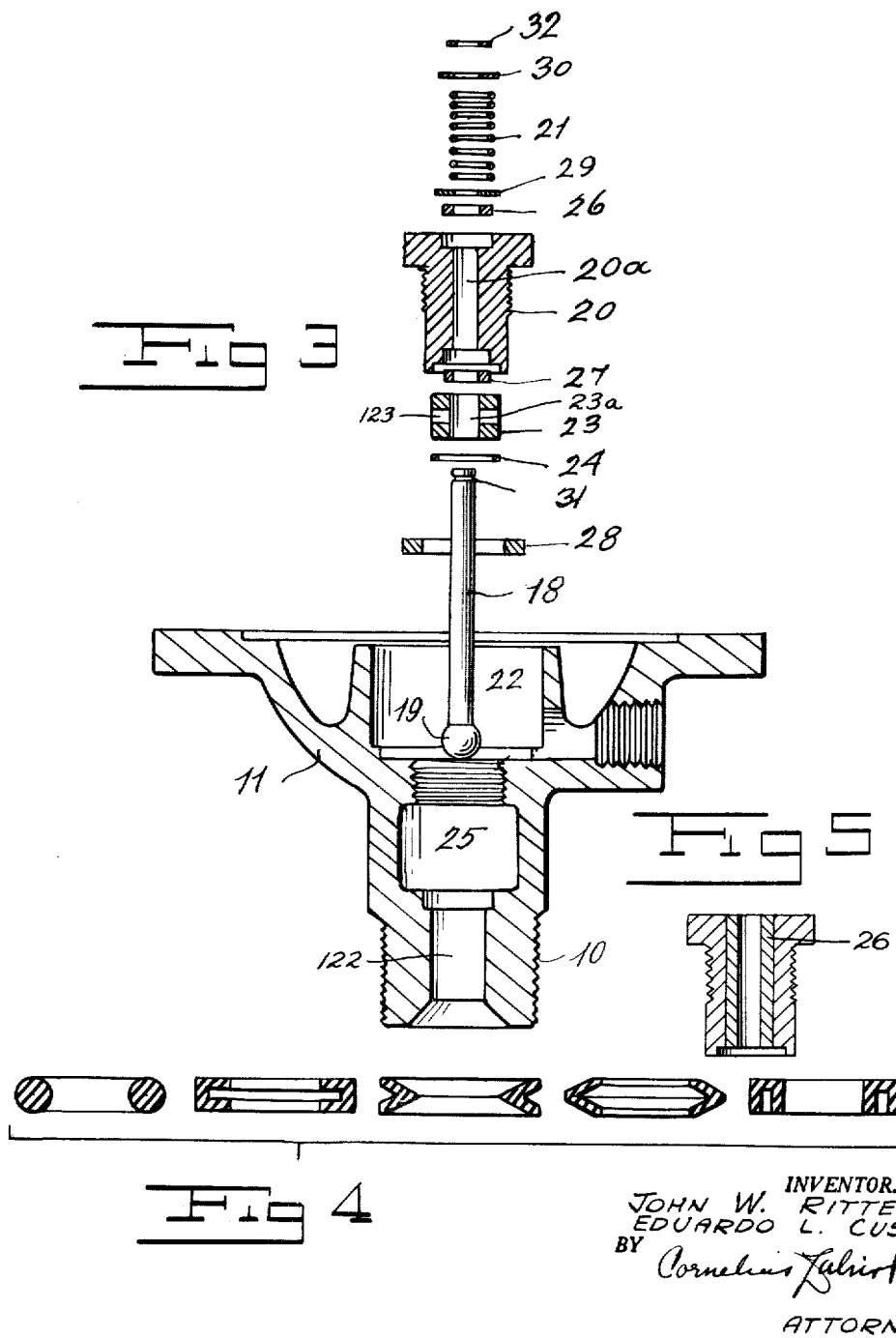
INVENTORS
JOHN W. RITTER
EDUARDO L. CUSI
BY
ATTORNEY

United States Patent Office 3,099,431
Patented July 30, 1963

3,099,431
VALVE WITH STEM SEAL
John W. Ritter, Emmaus, and Eduardo L. Cusi, Bethlehem, Pa., assignors to Sarco Company, Inc., New York, N.Y., a corporation of New York
Filed Apr. 7, 1961, Ser. No. 101,513
2 Claims. (Cl. 251—214)

This invention relates to improvements in pressure reducing valves of the character wherein the flow of fluid through the main valve seat of the housing is governed by differential pressures exerted upon the opposite sides of a main diaphragm and is, in turn, regulated by a pilot mechanism associated with the bonnet of the valve. Odend'hal Patent No. 2,155,170, Spence Patent No. 2,879,792, and other patents of the same general character are exemplary of this broad, well known type of reducing valve.

In valves of this kind, the pilot mechanism comprises a pilot valve with a spindle having a sliding fit in a spindle guide. If the clearance provided for this sliding fit is too great, the leakage therethrough from the high pressure side of the valve housing will unduly influence and adversely affect regulation of reduction in pressure. If the clearance is too little, there is the ever-present tendency for said spindle to stick in its guide due to the various causes including, inter alia, the entrance of dirt or extraneous matter into this clearance space. These factors have caused no little difficulty in the operation and maintenance of pressure reducing valves but prior to this invention no satisfactory means has been provided for overcoming this problem.

As a result of protracted experiments and attempts to solve this problem in various ways and by changes in valve construction, we have discovered that, by the incorporation of an appropriate elastomer bushing or bushings within the spindle guide, it is possible to provide smooth sliding operation of the spindle and at the same time practically eliminate the leakage around the spindle of the pilot valve and thus insure more accurate pressure reduction of the fluids passing through the valve housing.

The elastomer bushing or bushings used should provide for minimum friction between the spindle and the bushing. This may be insured by employing an elastomer which will be lubricated by the controlled fluid or by the employment of one which is self-lubricating in character. Either natural or synthetic elastomers may be employed for this purpose, a few illustrative examples of which are as follows:

"Viton," a linear copolymer of hexafluoropropylene and vinylidene fluoride
"Neoprene," a chloroprene
"Buna N," a butadiene acrylonitrile
"Buna S," a butadiene styrene
"Butyl," an isobutylene isoprene
"Thiokol," an organic polysulfide
"Silicone," a polysiloxane polymer
"Teflon," a tetrafluoroethylene resin
"Kel-F," a trifluorochloroethylene polymer The elastomer should be one which is substantially stable under pressure in that it will not appreciably swell or contract under the influence of the fluid to which it is subjected, but will maintain the adjustment into which it may be regulated. Furthermore, it must be one which embodies inherent resiliency, so that it may be compressed to form a firm and durable seal with respect to the parts between which this seal is desired. The foregoing examples of elastomers have been found to fulfill these requirements.

The bushing between the spindle and its guide may extend throughout the full length of the guide or for only a portion of such length, but in practice we find it convenient and economical to provide a relatively short bushing at each end of the guide. Experience has shown that this latter arrangement is thoroughly efficient in carrying out the purposes of this invention. In any event, the bushing or bushings may be fitted reasonably tight about the spindle so as to effectually preclude leakage of pressure or the entrance of extraneous matter into the passage of the spindle guide.

A manufacturing advantage flowing from this invention is that the machining of the guide may be made less critical than heretofore required. No lapping or close grinding is necessary for the bushings will compensate for small inaccuracies in the size and shaping of the parts. Moreover, this invention assures an assembly of the elements of the pilot mechanism in such manner that all parts thereof are made readily accessible so that their maintenance is greatly facilitated.

Features of the invention, other than those adverted to, will be apparent from the hereinafter detailed description and appended claims, when read in conjunction with the accompanying drawings.

The accompanying drawings illustrate one practical embodiment of the invention, but the constructions therein shown are to be understood as illustrative, only, and not as defining the limits of the invention.

FIG. 3 is an exploded central section of certain parts of the pilot mechanism to which the present invention is directed.

FIG. 4 shows central sections through different illustrative forms of bushing which may be used in accordance with this invention.

FIG. 5 is a central section of the spindle guide showing the spindle guide bushed for the full length of the spindle passage therethrough.

Figure 1:
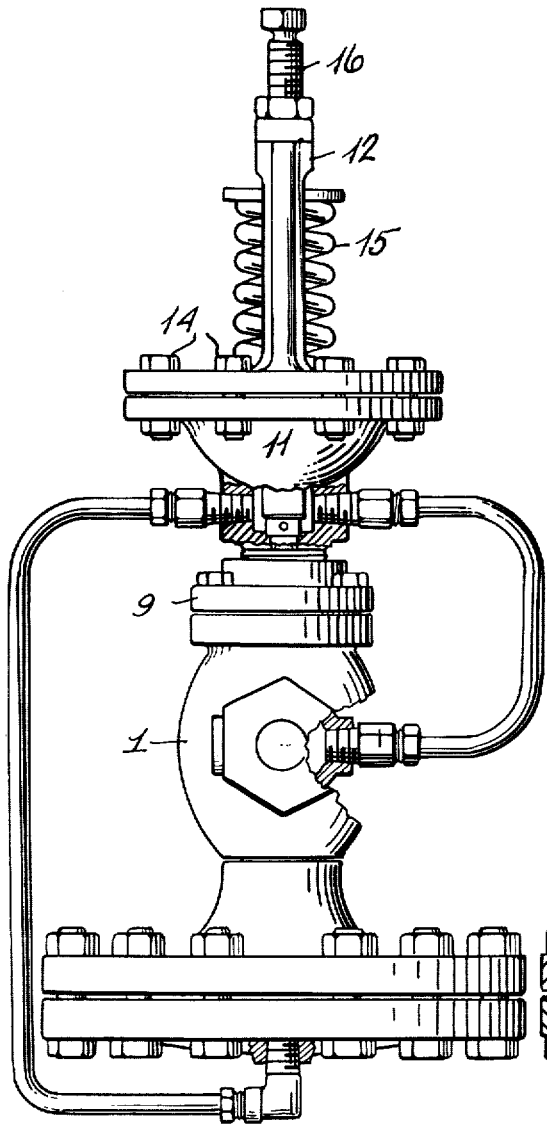
FIG. 1 is an elevation of a pressure reducing valve embodying this invention.

In said drawings, 1 designates a main valve housing having inlet and outlet passages 2 and 3, respectively, separated from one another by a partition 4 having therein a seat member 5 for a cooperating sealing member 6. The main valve stem 7 is secured to a pressure plate 8a which rests on the main diaphragm 8.

The bonnet 9 is interiorly threaded to receive the threaded shank 10 of pilot valve body 11 of the pilot valve mechanism and surmounting this body is a yoke 12. Between said yoke and pilot valve body a diaphragm 13 is clamped by bolts 14 and a regulating spring 15, adjusted by a screw 16, acts upon a plate 17 which bears upon the upper end of the spindle 18 of the pilot valve 19.

This spindle operates within a guide 20 and a compression spring 21 cooperates with said spindle to urge the pilot valve to its seat when the pressure within the control chamber 22 is sufficient to overcome the pressure of the regulating spring 15.

All of the parts thus far described are conventional, common and well known in the art and form no part of this invention, except as they are supplemented and modified to carry out the objects and purposes of this invention.

As shown in the drawings, the valve 19 is adapted to cooperate with a seat 23 of hardened material, ground flat on both top and bottom. It rests on a gasket 24 received on an abutment formed in a rabbet at the base of the intermediate chamber 25 located above a lower chamber 122 in the pilot valve body. The seat member 23 has a lateral opening 123 leading from the passage 23a to the intermediate chamber 25 (see FIG. 3).

Figure 2:
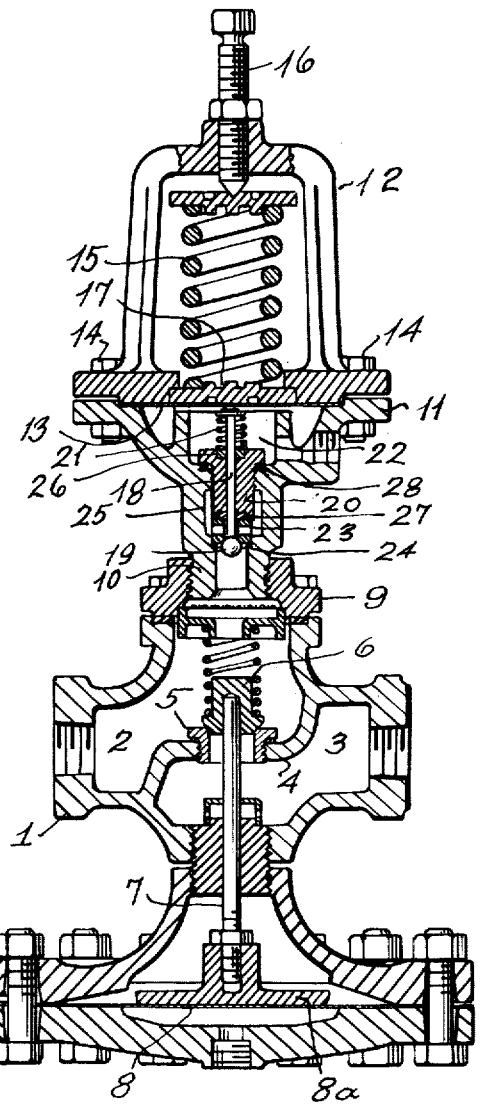
FIG. 2 is a vertical section through the valve of FIG. 1.

In the construction of FIGS. 2 and 3, the upper and lower ends of the guide 20 are recessed to receive bushings 26 and 27, respectively, of the elastomer material. Both of the bushings are firmly seated within said recesses and the spindle has close sliding relation therewith. In these figures, the bushings are shown in the form of rings or substantially rectangular cross section, although, if desired, these bushings may have any of the cross sectional shapes shown in FIG. 4 or be of such other cross section as will serve the purposes of this invention.

As seen in FIG. 2, the valve seat 23 rests on a spindle guide gasket 24, preferably of copper. The lower elastomer bushing 27 rests on the seat 23. The guide 20 is threaded to screw into a threaded opening in the casing 11 and bears upon a resilient gasket 28. In assembling these parts the spindle guide 20 is screwed down tightly to firmly press the seat 23 against the copper gasket 24 and the lower elastomer bushing 27 against the upper surface of the seat 23. The upper gasket 28 is sufficiently resilient to insure such firm engagement between these parts as to preclude undesirable leakage between them. Moreover, the threaded connection between the bushing 20 and the pilot valve body 11 makes it possible to apply such axial pressure upon the resilient bushings 26 and 27 as may be required to insure proper sealing engagement between the inner peripheries of the bushings and the spindle so that any appreciable leakage about the spindle is precluded. The resiliency of these bushings insures long life of the resulting seals so that frequent adjustments are unnecessary.

The spindle 18 extends upwardly from the pilot valve 19, through the seat 23, guide 20, elastomer bushings 27 and 26 to and through a washer 29. Beyond this washer it passes through spring 21, washer 30 and is provided with a circumferential groove 31 in which is seated a spring retaining ring key 32.

With this arrangement, the entire pilot valve mechanism is a sub-assembly which can easily be removed for servicing and for replacement. By removing yoke 12, the entire pilot valve assembly may be removed by applying a socket wrench to the hexagonal head of the spindle guide 20. After this assembly is removed, and after removing lock key 32, the valve 19 and spindle 18 to which it is attached can be withdrawn from guide 20. Seat 23 is then accessible. This seat 23 is unique in that it is made of a hardened piece of material, ground flat on both sides. In conventional designs, this hardened seat is usually attached through threads. In this particular construction, it is held in place by a stem guide 20 pinching it to the pilot valve body. Gasket 28 is sufficiently resilient to compensate for slight inaccuracies in machining. Gasket 24 is relatively rigid and consequently a tight seal can be effected without the use of threads at this point. This construction also automatically provides a seal between seat 23 and guide 20 through a compression of the lower elastomer bushing 27. Since the faces of the seat 23 are ground parallel, said seat may be reversed to thereby double its useful life.

In the accompanying drawings, separate bushings are provided at each end of the spindle guide. In practice both of these bushings may be the same or they may be different without departing from this invention. Moreover, instead of providing two separate bushings as shown, the bore 20a of the spindle guide may be of substantially uniform diameter throughout its length and it may be bushed for its entire length with an elastomer of the character described, as shown in FIG. 5, without departing from this invention.

It will be apparent from the foregoing description, that this invention constitutes a marked improvement and an important advance over prior pilot valve constructions. Through its employment, the maintenance required is reduced to a minimum, the valve is more reliable over long periods of use, and the regulation of the desired reduction in steam pressure is rendered more uniformly constant over such periods than has heretofore been attainable in valves of this general type.

The foregoing detailed description sets forth the invention in its preferred practical forms, but the invention is to be understood as fully commensurate with the appended claims.

Having thus fully described the invention what we claim as new and desire to secure by Letters Patent is:

1. A pressure reducing valve having a pilot valve body provided therein with a control chamber and a remotely spaced abutment, a valve seat resting upon said abutment, a pilot valve guide threaded into said valve body coaxially of the seat and having an axial passage extending therethrough from the control chamber to and forming a continuation of a passage through the seat, a valve engaging with said seat and having an attached spindle extending through the seat and passage of the spindle with a bushing embracing the spindle between the seat and the guide to preclude the flow of undesirable fluid through said passage to the control chamber, said spindle guide exerting pressure between itself and said abutment to hold the seat firmly to the latter and maintain the bushing under axial compression.

2. A pressure reducing valve according to claim 1, wherein the bushing which embraces the spindle is an elastomer bushing.

References Cited in the file of this patent

UNITED STATES PATENTS

| | | |
|---|---|---|
| 1,486,452 | Post | Mar. 11, 1924 |
| 1,945,834 | Terry | Feb. 2, 1934 |
| 2,049,382 | Deming | July 28, 1936 |
| 2,270,037 | Corbin | Jan. 13, 1942 |
| 2,304,323 | Wiegers | Dec. 8, 1942 |
| 2,615,763 | Wolford | Oct. 28, 1952 |
| 2,617,233 | Hoffman | Nov. 11, 1952 |
| 2,658,716 | Winfree | Nov. 10, 1953 |
| 2,665,711 | Parks | Jan. 12, 1954 |
| 2,681,257 | Niesemann | June 15, 1954 |
| 2,747,607 | Matasovic | May 29, 1956 |
| 2,757,516 | Buttolph | Aug. 7, 1956 |
| 2,765,185 | Mott | Oct. 2, 1956 |
| 2,767,730 | Laird | Oct. 23, 1956 |
| 2,854,021 | Baldwin | Sept. 30, 1958 |
| 2,879,792 | Spence | Mar. 31, 1959 |
| 2,903,011 | Long | Sept. 8, 1959 |

UNITED STATES PATENT OFFICE

CERTIFICATE OF CORRECTION

Patent No. 3,099,431                           July 30, 1963

John W. Ritter et al.

It is hereby certified that error appears in the above numbered patent requiring correction and that the said Letters Patent should read as corrected below.

In the heading to the drawings, Sheets 1 and 2, line 2, for "VALVE WITH STERN SEAL", each occurrence, read -- VALVE WITH STEM SEAL --.

Signed and sealed this 4th day of February 1964.

(SEAL)
Attest:
ERNEST W. SWIDER

Attesting Officer

EDWIN L. REYNOLDS

Acting Commissioner of Patents